United States Patent
Hu et al.

(10) Patent No.: US 12,464,282 B2
(45) Date of Patent: Nov. 4, 2025

(54) DUAL-PURPOSE CIRCUIT FOR SOUND EMISSION AND SOUND PICKUP APPLIED TO INDIVIDUAL SPEAKER UNIT

(71) Applicant: GUANGZHOU OPSMEN TECH CO., LTD, Guangzhou (CN)

(72) Inventors: Peilin Hu, Guangzhou (CN); Zhenjiang Li, Huizhou (CN); Yongan He, Yulin (CN)

(73) Assignee: GUANGZHOU OPSMEN TECH CO., LTD, Guangzhou (CN)

( * ) Notice: Subject to any disclaimer, the term of this patent is extended or adjusted under 35 U.S.C. 154(b) by 0 days.

(21) Appl. No.: 19/209,699

(22) Filed: May 15, 2025

(65) Prior Publication Data
US 2025/0274705 A1    Aug. 28, 2025

Related U.S. Application Data

(63) Continuation of application No. PCT/CN2025/073951, filed on Jan. 22, 2025.

(30) Foreign Application Priority Data

Apr. 11, 2024    (CN) .......................... 202410436159.1

(51) Int. Cl.
*H04R 3/00* (2006.01)
*H04W 4/10* (2009.01)

(52) U.S. Cl.
CPC ............ *H04R 3/00* (2013.01); *H04R 2499/11* (2013.01); *H04W 4/10* (2013.01)

(58) Field of Classification Search
CPC ........ H04R 3/00; H04R 2499/11; H04W 4/10
See application file for complete search history.

(56) References Cited

U.S. PATENT DOCUMENTS

| | | | |
|---|---|---|---|
| 10,278,034 B1* | 4/2019 | Saptharishi | H04B 7/18506 |
| 2014/0307910 A1* | 10/2014 | Howlett | H04R 29/004 |
| | | | 381/369 |
| 2022/0406300 A1* | 12/2022 | Verhoeve | H04N 21/42203 |

FOREIGN PATENT DOCUMENTS

| | | |
|---|---|---|
| CN | 201111915 Y | 9/2008 |
| CN | 103581801 A | 2/2014 |

(Continued)

OTHER PUBLICATIONS

Ru Cao, "Audio control system applied to self-service terminal devices", Practical Electronics, Dec. 26, 2022, No. 23, pp. 72-75.

*Primary Examiner* — Yogeshkumar Patel

(57) ABSTRACT

A dual-purpose circuit for sound emission and sound pickup applied to an individual speaker unit, including a communication interface module, an electronic power switch module, a filter, a signal gain module, a double-pole double-throw switch module and a sound-emission unit interface module. A microphone interface unit is connected to the electronic power switch module, the signal gain module and the double-pole double-throw switch module. The double-pole double-throw switch module has a two normally-closed terminals connected to the signal gain module and two common terminals connected to the sound-emission unit interface module. A negative pole and a positive pole of a speaker interface unit are respectively connected to two normally-open terminals of the speaker interface unit. A positive pole of a reception state switching interface unit is connected to an enable terminal of the double-pole double-throw switch module and an enable terminal of the electronic power switch module.

5 Claims, 3 Drawing Sheets

(56) References Cited

FOREIGN PATENT DOCUMENTS

| | | |
|---|---|---|
| CN | 206743531 U | 12/2017 |
| CN | 210899524 U | 6/2020 |
| CN | 220755033 U | 4/2024 |
| KR | 20160033490 A | 3/2016 |

* cited by examiner

DUAL-PURPOSE CIRCUIT FOR SOUND EMISSION AND SOUND PICKUP APPLIED TO INDIVIDUAL SPEAKER UNIT

CROSS-REFERENCE TO RELATED APPLICATIONS

This application is a continuation of International Patent Application No. PCT/CN2025/073951, filed on Jan. 22, 2025, which claims the benefit of priority from Chinese Patent Application No. 202410436159.1, filed on Apr. 11, 2024. The content of the aforementioned application, including any intervening amendments made thereto, is incorporated herein by reference in its entirety.

TECHNICAL FIELD

This application relates to speakers, and more particularly to a dual-purpose circuit for sound emission and sound pickup applied to an individual speaker unit.

BACKGROUND

For a conventional wired communication headset to have its own speaker unit for sound emission and microphone unit for sound pickup, it needs a speaker with at least a 2-core connecting wire, a microphone with a 2-core connecting wire and a 1-core or 2-core push-to-talk (PTT) connecting cable, which are connected to the interphone through respective adapter plugs, so as to realize the combination of the sound emission and sound pickup functions of the headset.

In order to enhance the sound pickup performance of the microphone, a pole-type microphone structure with adjustable angle or length is commonly used, and the microphone is set as close to the mouth as possible; or the sound pickup sensitivity is enhanced while keeping the sensitivity of the single microphone unchanged. The unidirectional noise reduction microphone is used as a single microphone, that is, the unidirectional noise reduction function of the single microphone is used to reduce the pickup range of environmental noise. This facilitates the reduction of the pickup of environmental noise, resulting in a relatively clearer sound of the main sound source that is desired to be picked up.

In view of the labor protection scenes such as construction sites, heavy industrial factories, or machining workshops, as well as cabin operations, airport ground operations, military and police attendance and other scenes with complex environments, workers often need to communicate with each other in real time to ensure smooth operations due to work relationships. However, workers working in such environments may inevitably encounter various environmental noises, which have a great impact on the communication quality of the workers. In order to solve the problem of environmental noise affecting the communication quality, it is necessary to wear excellent headsets. The common features of these headsets are the high-quality built-in microphones and structural cavities, as well as the premium communication circuit design of the headsets, which can reduce the sound distortion in the receiving process to restore the real sound of the sound source. In addition, the corresponding software noise reduction algorithm is adapted to enable the picked-up sound to be intelligently processed, further filtering out some noise, thereby enhancing the sound reception effect. However, this undoubtedly places high demands on the design of the headsets, resulting in great difficulty in the design and manufacture of headsets and a sharp increase in costs with low value proposition. Therefore, these headsets are commonly expensive and are only used in some premium industry. For some industry scenarios that require cost-efficient headsets to achieve high-definition communication quality in high-noise scenarios, the complex structural design (i.e., cavity design and connecting rod or connecting cable) adopted by the sound pickup unit of these headsets leads to high costs, making it difficult to popularize and use.

In general, the prior art has at least the following technical problems: the existing headsets with sound emission and sound pickup functions all adopt complex structural designs to ensure excellent noise reduction and sound pickup effects, resulting in excessively high costs.

SUMMARY

An object of the disclosure is to provide a dual-purpose circuit for sound emission and sound pickup applied to an individual speaker unit, so as to solve the problem that existing headsets with sound emission and sound pickup functions require complex structural designs to ensure excellent noise reduction and sound pickup effects, resulting in excessively high costs.

In order to achieve the above object, the following technical solutions are adopted.

This application provides a dual-purpose circuit for sound emission and sound pickup applied to an individual speaker unit, comprising:
 a communication interface module;
 an electronic power switch module;
 a filter;
 a signal gain module;
 a double-pole double-throw switch module; and
 a sound-emission unit interface module;
 wherein the communication interface module comprises a microphone interface unit, a speaker interface unit and a reception state switching interface unit;
 a positive pole of the microphone interface unit is connected to the electronic power switch module, the signal gain module and the double-pole double-throw switch module; the electronic power switch module, the filter and the signal gain module are connected in sequence; a grounding terminal of the signal gain module is connected to ground; a first normally-closed terminal and a second normally-closed terminal of the double-pole double-throw switch module are connected to the signal gain module, a first common terminal and a second common terminal of the double-pole double-throw switch module are connected to the sound-emission unit interface module, and a grounding terminal of the double-pole double-throw switch module is connected to ground; and a negative pole of the microphone interface unit is connected to ground;
 a negative pole of the speaker interface unit is connected to a first normally-open terminal of the double-pole double-throw switch module; and a positive pole of the speaker interface unit is connected to a second normally-open terminal of the double-pole double-throw switch module;
 a positive pole of the reception state switching interface unit is connected to an enable terminal of the double-pole double-throw switch module and an enable terminal of the electronic power switch module; and a negative pole of the reception state switching interface unit is connected to ground; and
 the sound-emission unit interface module is configured to connect a low-impedance speaker unit; the reception state switching interface unit is configured to connect a push-to-talk (PTT) switch; and the PTT switch is configured to control the electronic power switch module and the double-pole double-throw switch module, such that a working state of the low-impedance speaker unit is switched between a sound pickup state and a sound emission state.

In some embodiments, the working state of the low-impedance speaker unit is switched through steps of:

controlling, by the PTT switch, the electronic power switch module to be in a closed state, so that the signal gain module is turned on, and synchronously pulling down the enable terminal of the double-pole double-throw switch module to allow the first common terminal and the second common terminal of the double-pole double-throw switch module to be respectively connected to the first normally-closed terminal and the second normally-closed terminal of the double-pole double-throw switch module, so that the low-impedance speaker unit is switched to the sound pickup state; and controlling, by the PTT switch, the electronic power switch module to be in an open state, so that the signal gain module is turned off, and synchronously pulling up the EN terminal of the double-pole double-throw switch module to allow the first common terminal and the second common terminal of the double-pole double-throw switch module to be respectively connected to the first normally-open terminal and the second normally-open terminal of the double-pole double-throw switch module, so that the low-impedance speaker unit is switched to the sound emission state.

In some embodiments, the PTT switch is mechanical.

In some embodiments, the dual-purpose circuit further comprises a clock signal module; the reception state switching interface unit serves as a part of the clock signal module; and the clock signal module is configured to perform enabling control of the electronic power switch module and the double-pole double-throw switch module; and the working state of the low-impedance speaker unit is switched through steps of:

controlling, by a negative pulse width of the clock signal module, the electronic power switch module to be in a closed state, so that the signal gain module is turned on, and synchronously pulling down the enable terminal of the double-pole double-throw switch module to allow the first common terminal and the second common terminal of the double-pole double-throw switch module to be respectively connected to the first normally-closed terminal and the second normally-closed terminal of the double-pole double-throw switch module, so that the low-impedance speaker unit is switched to the sound pickup state; and controlling, by a positive pulse width of the clock signal module, the electronic power switch module to be in an open state, so that the signal gain module is turned off, and synchronously pulling up the enable terminal of the double-pole double-throw switch module to allow the first common terminal and the second common terminal of the double-pole double-throw switch module to be respectively connected to the first normally-open terminal and the second normally-open terminal of the double-pole double-throw switch module, so that the low-impedance speaker unit is switched to the sound emission state.

In some embodiments, in a case where the low-impedance speaker unit is mounted in an earplug-wearable headset, the sound pickup state of the low-impedance speaker unit serves as an ear canal sound-pickup state.

In some embodiments, the double-pole double-throw switch module is a double-pole double-throw electronic analog switch or a double-pole double-throw mechanical switch.

In some embodiments, the low-impedance speaker unit is a dynamic unit, a balanced armature unit, an electrostatic diaphragm speaker unit or a planar diaphragm unit; and an impedance of the low-impedance speaker unit is 4-2.2K Ω.

In some embodiments, the signal gain module comprises an operational amplifier; and an input mode of the operational amplifier is a differential input mode, a single-ended non-inverting input mode, a single-ended inverting input mode or a discrete component input mode.

In some embodiments, a signal output by a chip core generator of the clock signal module has a frequency of 8-48 KHz.

Compared to the prior art, the present disclosure has the following beneficial effects.

The dual-purpose circuit of the present disclosure includes the communication interface module, the electronic power switch module, the filter, the signal gain module, the double-pole double-throw switch module and the sound-emission unit interface module. In order to realize two working states of sound pickup and sound emission, the communication interface module includes the microphone interface unit, the speaker interface unit and the reception state switching interface unit. A signal sent by the reception state switching interface unit is used to control the circuit to switch between connecting the microphone interface unit and the speaker interface unit, thereby realizing the switch between sound pickup and sound emission.

In the present disclosure, the positive pole of the microphone interface unit is connected to the electronic power switch module, the signal gain module and the double-pole double-throw switch module; the electronic power switch module, the filter and the signal gain module are connected in sequence; the grounding terminal of the signal gain module is connected to ground; the first normally-closed terminal and the second normally-closed terminal of the double-pole double-throw switch module are connected to the signal gain module, the first common terminal and the second common terminal of the double-pole double-throw switch module are connected to the sound-emission unit interface module, and the grounding terminal of the double-pole double-throw switch module is connected to ground; and the negative pole of the microphone interface unit is connected to ground. In this way, a conversation sound-pickup bypass is formed by the microphone interface unit, the filter, the signal gain module and the sound-emission unit interface module, so that the sound pickup can be realized through the sound-emission unit interface module. In addition, the sound-emission unit interface module is configured to connect the low-impedance speaker unit. Its sound collection principle is that if the low-impedance speaker unit is a dynamic unit, a voice coil will be driven by the external sound pressure to move to generate an alternating signal. The alternating signal is transmitted to the signal gain module, and is converted into an audio signal in the signal gain module. Then, the audio signal is transmitted to the microphone interface unit via the filter, thus realizing the use of the dynamic unit as a sound pickup unit.

The positive pole of the speaker interface unit is connected to the second normally-open terminal of the double-pole double-throw switch module; the negative pole of the speaker interface unit is connected to the first normally-open terminal of the double-pole double-throw switch module; the positive pole of the reception state switching interface unit is connected to the enable terminal of the double-pole double-throw switch module and the enable terminal of the electronic power switch module; and the negative pole of the reception state switching interface unit is connected to ground. In this way, a conversation sound-emission bypass is formed by the speaker interface unit and the sound-emission unit interface module, thus realizing the use of the low-impedance speaker unit as a sound emission unit.

The mechanism for switching between the sound pickup circuit and the sound emission circuit using an individual speaker unit is to control the electronic power switch module and the double-pole double-throw switch module through the reception state switching interface unit to switch the low-impedance speaker unit between the sound pickup state and the sound emission state, thereby realizing the two major functions of sound pickup and sound emission by using an individual speaker and an integrated circuit. Compared with the complex cavity, separate speakers, multiple microphones and cables required to achieve clear sound reception in a complex noisy environment in the prior art, the structural design and cavity design of the sound pickup unit, as well as the use of connecting rods or connecting cables can be greatly simplified, resulting in a significant cost reduction. Moreover, when the headset is an earplug-wearable headset, the low-impedance speaker unit serves as an ear canal sound-pickup unit, so that the ambient noise can be effectively filtered out by the earplugs, thereby obtaining low-noise and high-definition sound pickup signals.

BRIEF DESCRIPTION OF THE DRAWINGS

In order to more clearly illustrate the technical solutions in the embodiments of the present disclosure or in the prior art, the drawings needed in the description of embodiments will be briefly introduced below. Obviously, presented in the drawings are only some embodiments of the present disclosure, which are not intended to limit the disclosure. For those of ordinary skill in the art, other drawings can be obtained based on these drawings without exerting creative efforts.

DETAILED DESCRIPTION OF EMBODIMENTS

This application will be clearly and completely described below with reference to the accompanying drawings in the embodiments of the disclosure.

Obviously, the described embodiments are merely some of the embodiments of the disclosure, but not all of the embodiments. Based on the embodiments of the disclosure, all other embodiments obtained by those of ordinary skill in the art without creative efforts shall fall within the scope of the disclosure defined by the appended claims.

Provided herein is a dual-purpose circuit for sound emission and sound pickup applied to an individual speaker unit, which effectively solves the problem that existing headsets sound emission and sound pickup functions all adopt complex structural designs to ensure excellent noise reduction and sound pickup effects, resulting in excessively high costs.

The embodiments will be described below with reference to the accompanying drawings of the disclosure. It should be noted that the entire contents of the configurations shown in the following embodiments are not necessarily limited to the solutions of the inventions recited in the appended claims.

Embodiment 1

Figure 1:
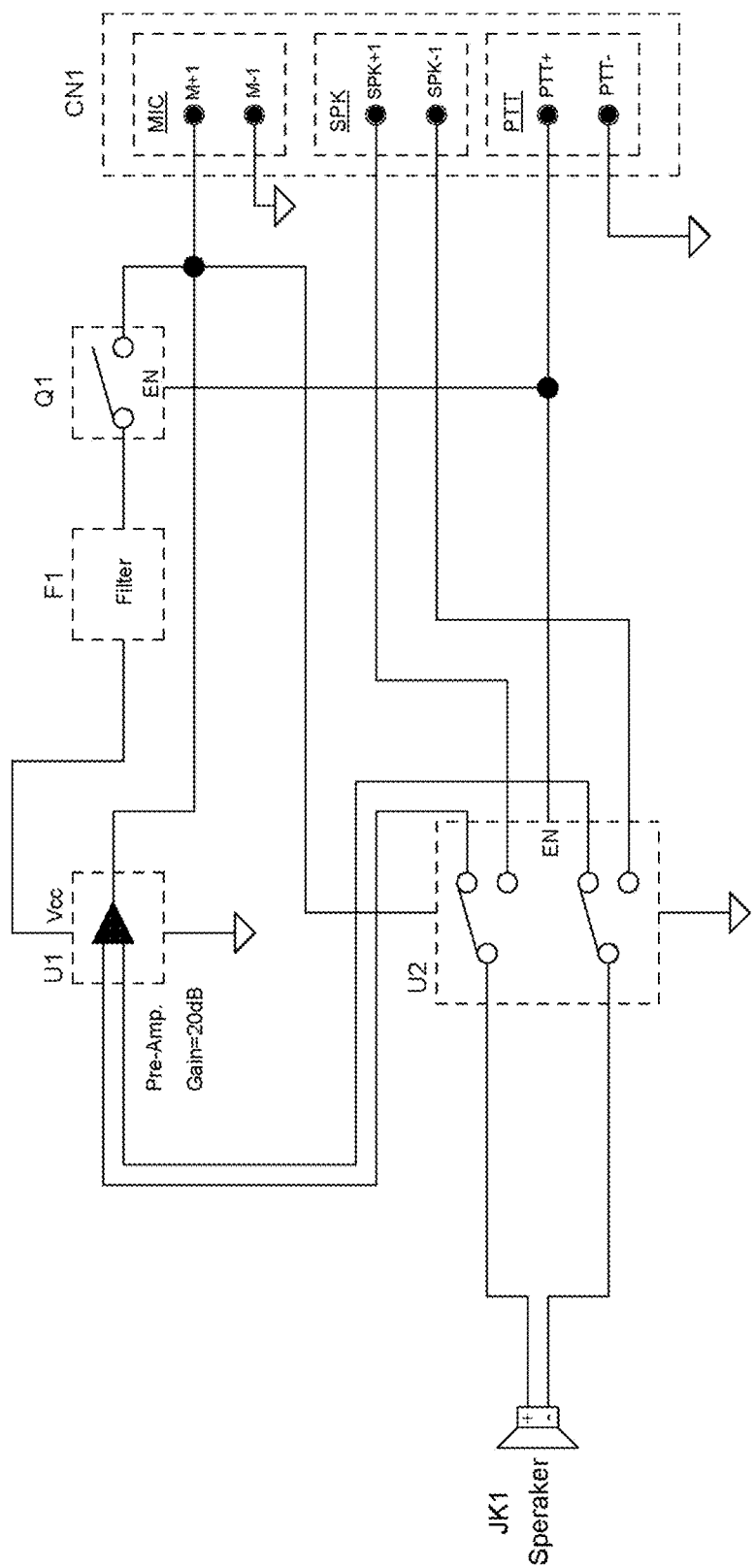
FIG. 1 is a circuit diagram of a dual-purpose circuit for sound emission and sound pickup applied to an individual speaker unit in Embodiment 1 of the present disclosure.
Figure 2:
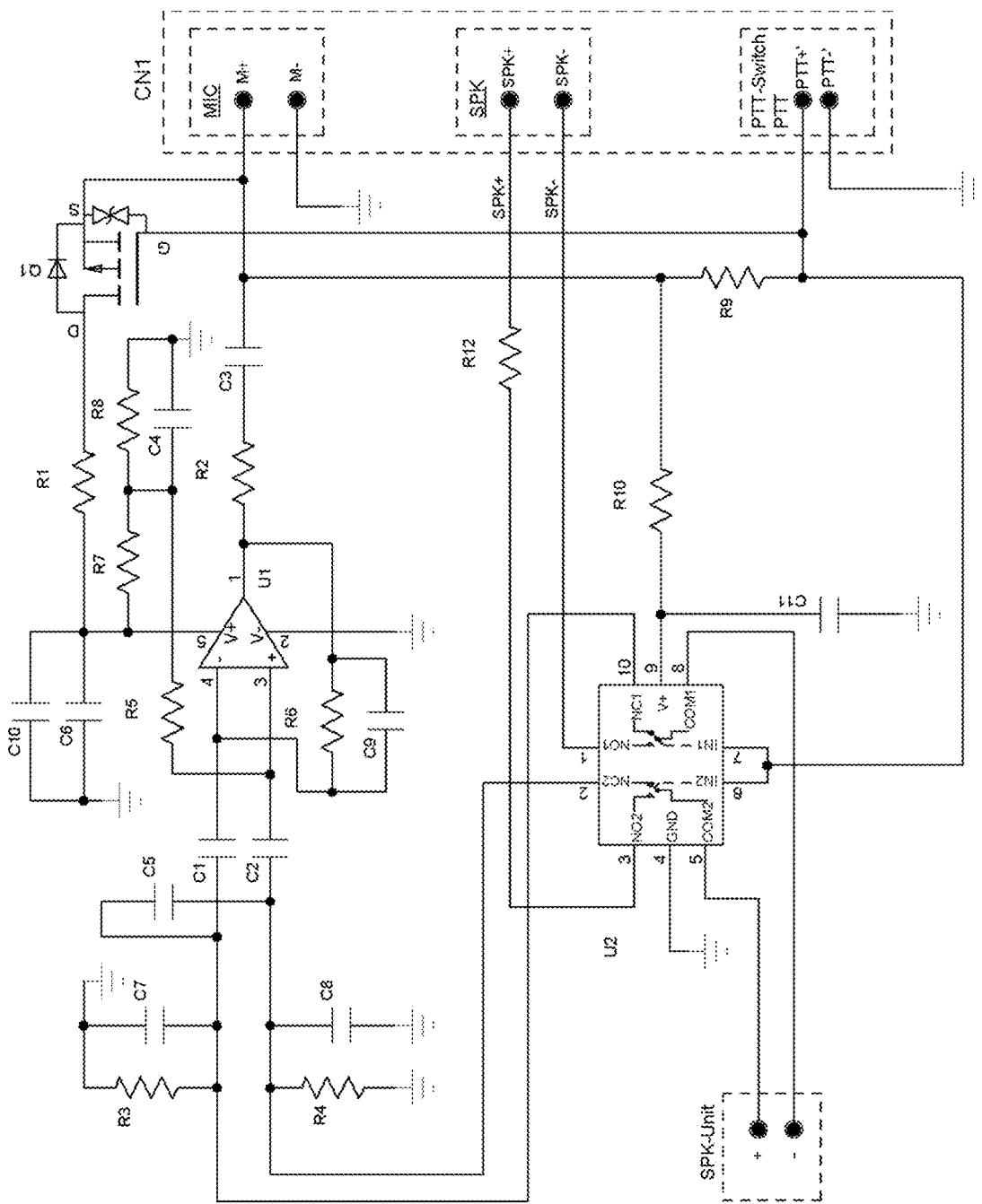
FIG. 2 schematically shows principle of the dual-purpose circuit in Embodiment 1 of the present disclosure.

As shown in FIGS. 1-2, a dual-purpose circuit for sound emission and sound pickup applied to an individual speaker unit is provided, which includes a communication interface module (CN1), an electronic power switch module (Q1), a filter (F1), a signal gain module (U1), a double-pole double-throw switch module (U2) and a sound-emission unit interface module (SPK-Unit). The communication interface module includes a microphone interface unit (MIC), a speaker interface unit (SPK) and a reception state switching interface unit (PTT). A positive pole of the MIC is connected to the Q1, the U1 and the U2. The Q1, the F1 and the U1 are connected in sequence. A grounding terminal of the U1 is connected to ground. A first normally-closed terminal (NC1) and a second normally-closed terminal (NC2) of the U2 are connected to the U1. A first common terminal (COM1) and a second common terminal (COM2) of the U2 are connected to the SPK-Unit. A grounding terminal of the U2 is connected to ground. A negative pole of the MIC is connected to ground. A negative pole of the SPK is connected to a first normally-open terminal (NO1) of the U2. A positive pole of the SPK is connected to a second normally-open terminal (NO2) of the U2. A positive pole of the PTT is connected to an enable (EN) terminal of the U2 and an EN terminal of the Q1. A negative pole of the PTT is connected to ground. The SPK-Unit is configured to connect a low-impedance speaker unit (KV2 Audio® JK1 Speaker-Unit). The PTT is configured to connect a PTT switch. The PTT switch is configured to control the Q1 and the U2, such that the low-impedance speaker unit is switched between a sound pickup state and a sound emission state.

In practical application, the dual-purpose circuit is provided with the CN1, the Q1, the F1, the U1, the U2 and the SPK-Unit. In order to realize the two working states (i.e., the sound pickup state and the sound emission state), the CN1 is provided with the MIC, the SPK and the PTT. A signal sent by the PTT is configured to control the circuit to switch between connecting the MIC and the SPK, so as to realize the switch between sound pickup and sound emission.

The positive pole of the MIC is connected to the Q1, the U1 and the U2. The Q1, the F1 and the U1 are connected in sequence. The grounding terminal of the U1 is connected to ground. The NC1 and NC2 of the U2 are connected to the U1. The COM1 and COM2 of the U2 are connected to the SPK-Unit. The grounding terminal of the U2 is connected to ground. The negative pole of the MIC is connected to ground. A conversation sound-pickup bypass is formed by the MIC, the F1, the U1 and the SPK-Unit, so that the sound pickup can be realized through the low-impedance speaker unit. The SPK-Unit is configured to connect the low-impedance speaker unit. Its sound collection principle is that if the low-impedance speaker unit is a dynamic unit, a voice coil will be driven by the external sound pressure to move to generate an alternating signal. The alternating signal is transmitted to the U1, and is converted into an audio signal in U1. Then, the audio signal is transmitted to the MIC via the F1, thus realizing the use of the dynamic unit as a sound pickup unit.

The positive pole of the SPK is connected to the NO2 of the U2. The negative pole of the SPK is connected to the NO1 of the U2. The positive pole of the PTT is connected to the EN terminal of the U2 and the EN terminal of the Q1. The negative pole of the PTT is connected to ground. A conversation sound-emission bypass is formed by the SPK and the SPK-Unit, thus realizing the use of the low-impedance speaker unit as a sound emission unit.

The mechanism for switching between the sound pickup circuit and the sound emission circuit using an individual speaker unit is to control the Q1 and the U2 through the PTT switch to switch the low-impedance speaker unit between the sound pickup state and the sound emission state, thereby realizing the two major functions of sound pickup and sound emission by using an individual speaker and an integrated circuit. Compared with the complex cavity, separate speakers, multiple microphones and cables required to achieve clear sound reception in a complex noisy environment in the prior art, the structural design and cavity design of the sound pickup unit, as well as the use of connecting rods or connecting cables can be greatly simplified, resulting in a significant cost reduction.

In this embodiment, as shown in FIGS. 1-2, the PTT is configured to connect a PTT switch.

When using the PTT switch, the working state of the low-impedance speaker unit is switched through the following steps.

(S1) The Q1 is controlled by the PTT switch to be in a closed state, so that the U1 is turned on. The EN terminal of the U2 is pulled down synchronously, so that the COM1 and COM2 of the U2 are respectively connected to the NC1 and NC2 of the U2. In this way, the low-impedance speaker unit is switched to the sound pickup state.

(S2) The Q1 controlled by the PTT switch to be in an open state, so that the U1 is turned off. The EN terminal of the U2 is pulled up synchronously, so that the COM1 and COM2 of the U2 are respectively connected to the NO1 and NO2 of the U2. In this way, the low-impedance speaker unit is switched to the sound emission state.

In an embodiment, the PTT switch is a mechanical PTT switch.

In an embodiment, the U2 is a double-pole double-throw electronic analog switch or a double-pole double-throw mechanical switch.

In an embodiment, the low-impedance speaker unit is a dynamic unit, a balanced armature unit, an electrostatic diaphragm speaker unit or a planar diaphragm unit, and an impedance of the low-impedance speaker unit is 4-2.2K Ω.

In an embodiment, the U1 includes an operational amplifier. An input mode of the operational amplifier is a differential input mode, a single-ended non-inverting input mode, a single-ended inverting input mode or a discrete component input mode.

In this embodiment, as shown in FIG. 2, the operational amplifier adopts a differential input mode to form a differential amplifier circuit.

Specifically, in practical application, as shown in FIG. 2, the Q1 is a P-channel metal-oxide-semiconductor field effect transistor (PMOS). The PTT switch is pressed to connect to ground, so that the Q1 is turned on to power the U1. The EN terminal of the U2 is pulled down synchronously, so that the COM1 and COM2 of the U2 are respectively connected to the NC1 and NC2 of the U2. The JK1 Speaker-Unit is selected, which adopts a dynamic unit and is connected to the SPK-Unit. When the external sound pressure acts on the dynamic unit, the voice coil is driven to move to generate an alternating signal. This alternating signal is transmitted to the U1 as a differential signal source, and is converted into an audio signal in U1. The audio signal is amplified in U1 by means of signal gain, then transmitted to MIC at the interphone interface sequentially through a resistor R2 and a capacitor C3, thus realizing the working principle of the dynamic speaker as a sound pickup unit.

When PTT switch is not pressed, Q1 is turned off to disconnect the power supply of the U1, so that the U1 loses the signal gain amplification function. At the same time, the EN terminal of the U2 is pulled up through a resistor R9, so that the COM1 and COM2 of the U2 are respectively connected to the NO1 and NO2 of the U2, and are disconnected from the NC1 and NC2 of the U2. That is, the JK1 Speaker-Unit is connected to the NO1 and NO2 of the U2 via the COM1 and COM2 of the U2, and the signal is transmitted to the SPK at the interphone interface via a resistor R12, thus realizing the working principle of the dynamic speaker as a sound emission unit.

Taking a gain of 20 dB as an example, a 20-dB gain amplifier circuit is constructed using a balanced input operational amplifier (Pre-Amp), and a differential amplifier configuration is adopted. In this configuration, the gain is determined by a ratio of the peripheral components.

The relationship between the gain A and decibel (dB) is expressed as the following equation:

$$A(\text{dB}) = 20 \log_{10}(A_V)$$

In the above equation, $A_V$ (in units of voltage ratio) is a numerical ratio of the voltage gain. For the gain of 20 dB, $20 = 20 \log_{10}(A_V)$. As a result, the numerical ratio $A_V$ can be calculated.

In the above gain calculation equation of the differential amplifier, an ideal operational amplifier is used and all resistors are accurate. The gain can be expressed as: $A_V = V_{out}/V_{in} = R_f/R_{in}$, where $R_f$ is a feedback resistor, and $R_{in}$ is an input resistor. In order to achieve a gain of 20 dB, the numerical ratio $A_V$ needs to be calculated first, and appropriate values of $R_f$ and $R_{in}$ are selected according to the $A_V$. After calculating the specific numerical ratio, a specific resistance value can be provided to achieve this gain.

A signal strength of the low-impedance speaker unit is relatively weaker than the output electrical signal of the conventional microphone pickup unit, so the U1 is required to provide a gain of approximately 20 dB or more to the MIC input interface of the interphone, so as to meet the required sensitivity of the electrical signal.

Embodiment 2

Figure 3:
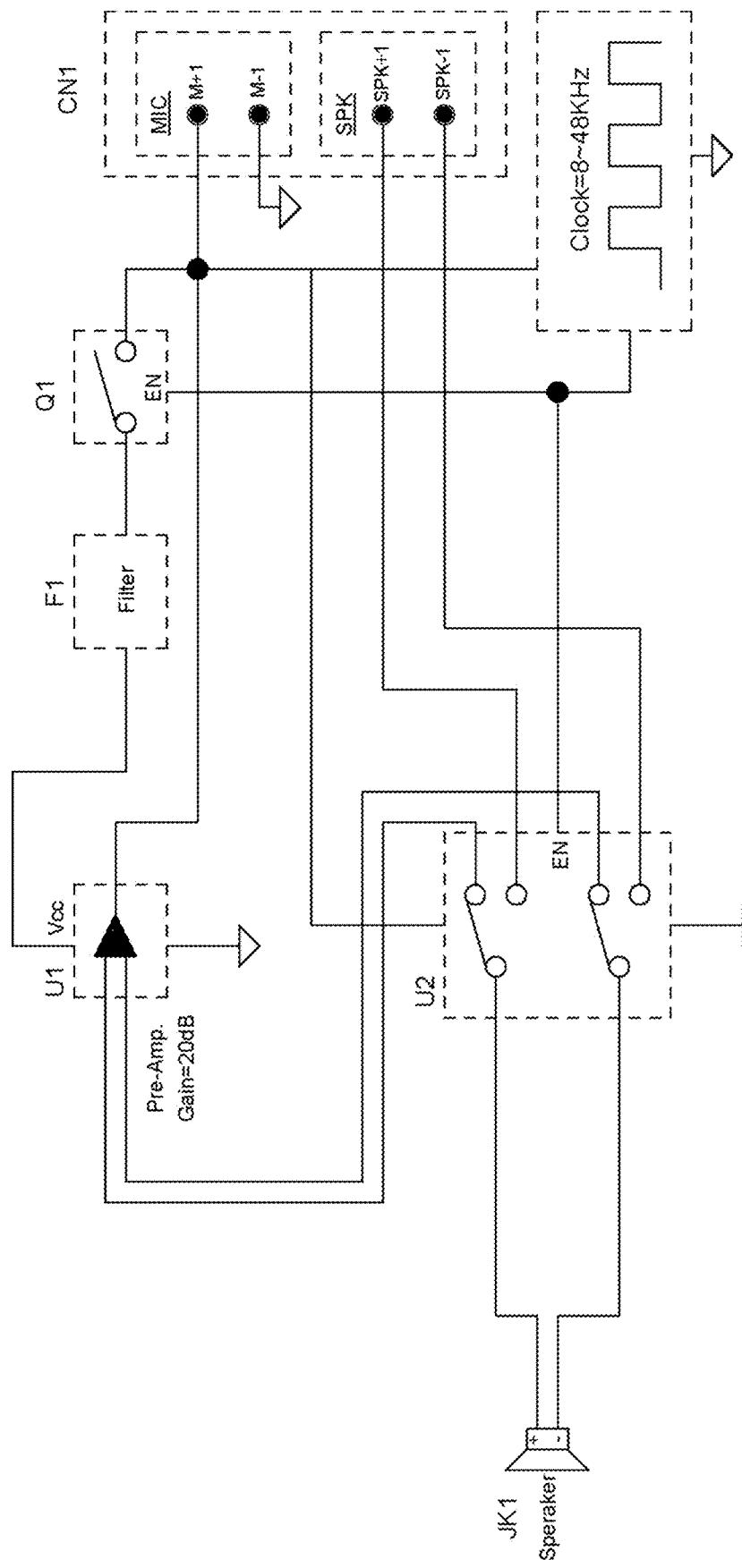
FIG. 3 is a circuit diagram of a dual-purpose circuit for sound emission and sound pickup applied to an individual speaker unit in Embodiment 2 of the present disclosure.

As shown in FIG. 3, a dual-purpose circuit for sound emission and sound pickup applied to an individual speaker unit is provided, with the difference from Embodiment 1 being that the dual-purpose circuit further includes a clock signal module (Clock). The PTT serves as a part of the Clock, and participates in the enabling control of the Q1 and the U2 together with the Clock.

In this embodiment, as shown in FIGS. 2-3, the working state of the low-impedance speaker unit is switched through the following steps.

(S1) The Q1 is controlled by a negative pulse width of the Clock to be in a closed state, so that the U1 is turned on. The EN terminal of the U2 is pulled down synchronously, so that the COM1 and COM2 of the U2 are respectively connected to the NC1 and NC2 of the U2. In this way, the low-impedance speaker unit is switched to the sound pickup state.

(S2) The Q1 is controlled by a positive pulse width of the Clock to be in an open state, so that the U1 is turned off. The EN terminal of the U2 is pulled up synchronously, so that the COM1 and COM2 of the U2 are respectively connected to the NO1 and NO2 of the U2. In this way, the low-impedance speaker unit is switched to the sound emission state.

A signal output by a chip core generator of the clock signal module has a frequency of 8-48 KHz.

In practical application, a signal with a frequency of 8-48 kHz is generated by the chip core generator, which allows the dual-purpose circuit of the disclosure to realize full-duplex signal reception and transmission, thus facilitating further application to ordinary consumer products, mobile phones or other audio communication devices. Since the signal generated by the Clock has a frequency of 8-48 kHz with high-speed switching, instantaneous switching between the sound pickup state and the sound emission state is hardly noticeable to the human ear, which enables full-duplex transmission and reception, eliminating the need for pressing the PTT switch.

Embodiment 3

Provided herein is a dual-purpose circuit for sound emission and sound pickup applied to an individual speaker unit, with the difference from Embodiments 1 and 2 being that in a case where the low-impedance speaker unit is mounted in an earplug-wearable headset, the sound pickup state of the low-impedance speaker unit serves as an ear canal sound-pickup state.

In practical application, when the headset is an earplug-wearable headset, the low-impedance speaker unit serves as an ear canal sound-pickup unit, so that the ambient noise can be effectively filtered out by the earplug attached to the headset, thereby achieving a low-noise and high-definition sound pickup effect, and further reducing noise during sound pickup.

The technical features described in the above embodiments can be combined arbitrarily. In order to make the description concise, not all possible combinations of the technical features in the above embodiments are described.

The embodiments described above are merely illustrative of the present disclosure, and are not intended to limit the patent scope of the present disclosure. It should be understood that various improvements and modifications made by those skilled in the art without departing from the spirit of the disclosure shall fall within the scope of the present disclosure defined by the appended claims.

What is claimed is:

1. A dual-purpose circuit for sound emission and sound pickup applied to an individual speaker unit, comprising:
   a communication interface module;
   an electronic power switch module;
   a filter;
   a signal gain module;
   a double-pole double-throw switch module; and
   a sound-emission unit interface module;
   wherein the communication interface module comprises a microphone interface unit, a speaker interface unit and a reception state switching interface unit;
   a positive pole of the microphone interface unit is connected to the electronic power switch module, the signal gain module and the double-pole double-throw switch module;
   the electronic power switch module, the filter and the signal gain module are connected in sequence;
   a grounding terminal of the signal gain module is connected to ground;
   a first normally-closed terminal and a second normally-closed terminal of the double-pole double-throw switch module are connected to the signal gain module, a first common terminal and a second common terminal of the double-pole double-throw switch module are connected to the sound-emission unit interface module, and a grounding terminal of the double-pole double-throw switch module is connected to ground; and
   a negative pole of the microphone interface unit is connected to ground;
   a negative pole of the speaker interface unit is connected to a first normally-open terminal of the double-pole double-throw switch module; and a positive pole of the speaker interface unit is connected to a second normally-open terminal of the double-pole double-throw switch module;
   a positive pole of the reception state switching interface unit is connected to an enable terminal of the double-pole double-throw switch module and an enable terminal of the electronic power switch module; and
   a negative pole of the reception state switching interface unit is connected to ground;
   the sound-emission unit interface module is configured to connect a low-impedance speaker unit;
   the reception state switching interface unit is connected to a push-to-talk (PTT) switch;
   the PTT switch is configured to control the electronic power switch module and the double-pole double-throw switch module, such that a working state of the low-impedance speaker unit is switched between a sound pickup state and a sound emission state;
   the PTT switch is mechanical;
   the working state of the low-impedance speaker unit is switched through steps of:
   controlling, by the PTT switch, the electronic power switch module to be in a closed state, so that the signal gain module is turned on, and synchronously pulling down the enable terminal of the double-pole double-throw switch module to allow the first common terminal and the second common terminal of the double-pole double-throw switch module to be respectively connected to the first normally-closed terminal and the second normally-closed terminal of the double-pole double-throw switch module, so that the low-impedance speaker unit is switched to the sound pickup state; and
   controlling, by the PTT switch, the electronic power switch module to be in an open state, so that the signal gain module is turned off, and synchronously pulling up the enable terminal of the double-pole double-throw switch module to allow the first common terminal and the second common terminal of the double-pole double-throw switch module to be respectively connected to the first normally-open terminal and the second normally-open terminal of the double-pole double-throw switch module, so that the low-impedance speaker unit is switched to the sound emission state;

the electronic power switch module is a P-channel metal-oxide-semiconductor field effect transistor (PMOS);

in a first case where the PTT switch is pressed to connect to ground, the electronic power switch module is turned on to power the signal gain module, and the enable terminal of the double-pole double-throw switch module is pulled down synchronously, so that the first common terminal and second common terminal of the double-pole double-throw switch module are respectively connected to the first normally-closed terminal and the second normally-closed terminal of the double-pole double-throw switch module; the low-impedance speaker unit adopts a dynamic unit, and is connected to the sound-emission unit interface module, such that when an external sound pressure acts on the dynamic unit, a voice coil is driven to move to generate an alternating signal;

the alternating signal is transmitted to the signal gain module as a differential signal source, and is converted into an audio signal in the signal gain module;

the audio signal is amplified in the signal gain module by means of signal gain, then transmitted to the microphone interface unit at an interphone interface sequentially through a first resistor and a first capacitor, thus realizing a working principle of the dynamic speaker as a sound pickup unit; and in a second case where the PTT switch is not pressed, the electronic power switch module is turned off to disconnect the power supply of the signal gain module, the signal gain module loses a signal gain amplification function, and the enable terminal of the double-pole double-throw switch module synchronously is pulled up through a second resistor, so that the first common terminal and second common terminal of the double-pole double-throw switch module are respectively connected to the first normally-open terminal and the second normally-open terminal of the double-pole double-throw switch module, and are disconnected from the first normally-closed terminal and the second normally-closed terminal of the double-pole double-throw switch module, that is, the low-impedance speaker unit is connected to the first normally-open terminal and the second normally-open terminal of the double-pole double-throw switch module via the first common terminal and the second common terminal of the double-pole double-throw switch module, and a signal is transmitted to the speaker interface unit at the interphone interface via a third resistor, thus realizing a working principle of the dynamic speaker as the sound-emission unit.

2. The dual-purpose circuit of claim 1, wherein in a case where the low-impedance speaker unit is mounted in an earplug-wearable headset, the sound pickup state of the low-impedance speaker unit serves as an ear canal sound-pickup state.

3. The dual-purpose circuit of claim 1, wherein the double-pole double-throw switch module is a double-pole double-throw electronic analog switch or a double-pole double-throw mechanical switch.

4. The dual-purpose circuit of claim 1, wherein the low-impedance speaker unit is a dynamic unit, a balanced armature unit, an electrostatic diaphragm speaker unit or a planar diaphragm unit; and an impedance of the low-impedance speaker unit is 4-2.2K Ω.

5. The dual-purpose circuit of claim 1, wherein the signal gain module comprises an operational amplifier; and an input mode of the operational amplifier is a differential input mode, a single-ended non-inverting input mode, a single-ended inverting input mode or a discrete component input mode.

\* \* \* \* \*